Figure 1:
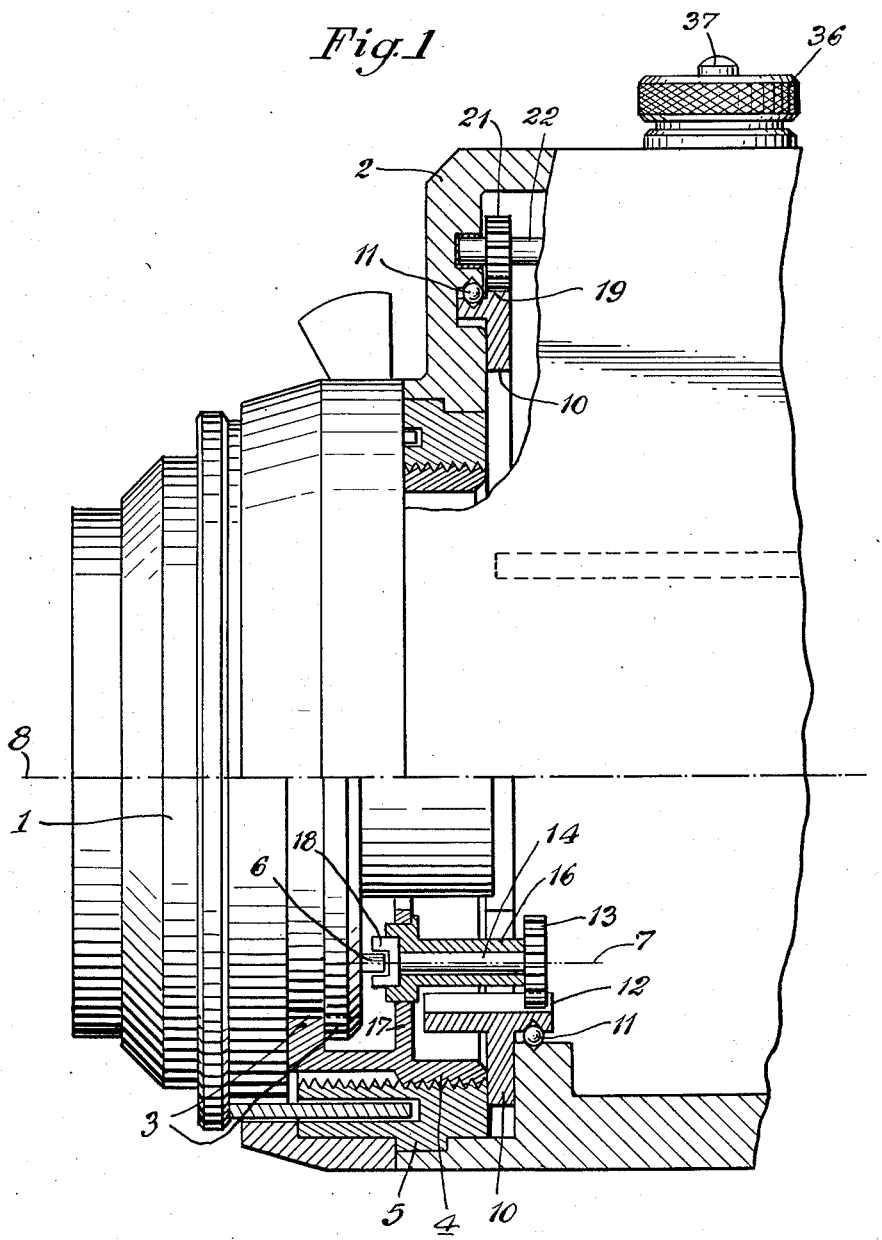

Jan. 24, 1961 W. GÜNTHER 2,969,006
CAMERA SHUTTER
Filed Nov. 21, 1955 2 Sheets-Sheet 1

Inventor:
Willi Günther,
by Singer, Stern & Carlburg
Attorneys.

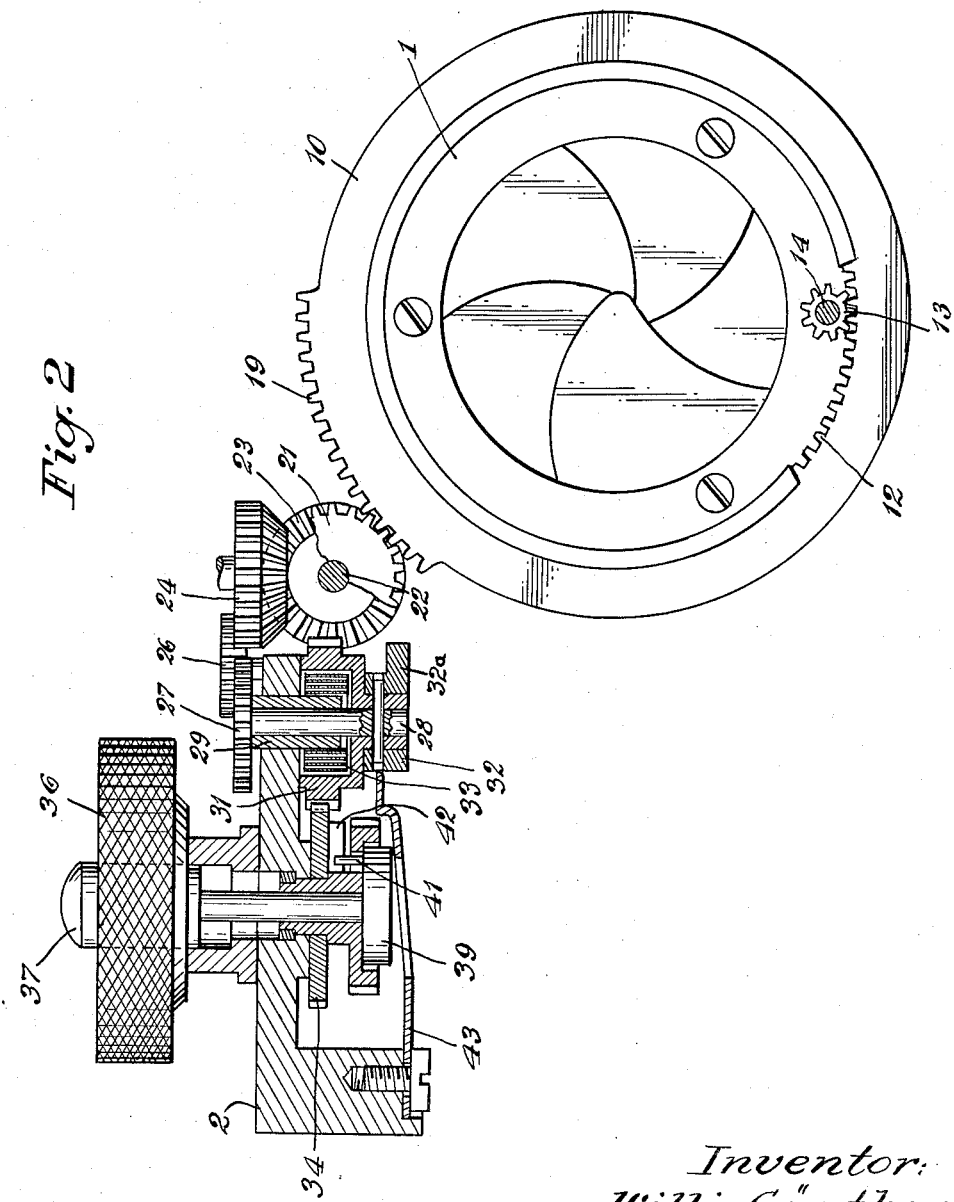

United States Patent Office 2,969,006
Patented Jan. 24, 1961

2,969,006
CAMERA SHUTTER

Willi Günther, Stuttgart, Germany, assignor to Zeiss Ikon A. G. Stuttgart, Stuttgart, Germany Filed Nov. 21, 1955, Ser. No. 547,976

Claims priority, application Germany Nov. 29, 1954

5 Claims. (Cl. 95—53)

This invention relates generally to cameras and more particularly to a camera mechanism for operating the camera shutter.

In modern cameras, the rate at which pictures may be taken has been increased by coupling the shutter mechanism to the film drive mechanism. Usually this requires mounting of the operating mechanism in the front of the camera adjacent to the central shutter. Proper operation of the shutter usually requires means for actuating the shutter releasing mechanism and shutter segments may also have to be operated before the picture is taken as is the case with one type of lens mirror reflex camera. In some arrangements it may be necessary to control the diaphragm from the rear of the camera regardless of whether the diaphragm is located inside the central shutter device or in the photographic optical system. Since the optical path must be free of obstructions, it is necessary that any mechanism used to control the shutter arrangements lie outside of the optical system.

One object of this invention is to provide an improved arrangement for operating the shutter of a camera.

Another object of this invention is to provide an improved actuating mechanism for the shutter of a camera from a point on the camera removed from the shutter mechanism wherein all connections with the shutter mechanism are made outside the optical path of the lens system of the camera.

A further object of this invention is to provide an actuating mechanism for operating the shutter mechanism of a camera embodying a ring member, rotatably mounted about the optical axis of the camera and outside the optical path, having a driving connection with the shutter mechanism and having a connection extending externally of the camera body affording manual operation of the shutter from a convenient point externally of the camera and removed from the shutter.

In the embodiment of the invention herein disclosed, a ring having internal and external gear segments in approximately diametrically oppositely disposed positions is rotatably journalled in the camera body substantially coaxially of the optical axis and outside the optical path. The ring is disposed behind the lens system and a spur gear drive from the internal gear segment extends forwardly into and in driving connection with the shutter mechanism of the camera. An externally mounted rotatable knob is geared to the external gear segment of the ring. Hence, rotation of the knob actuates the shutter mechanism.

A ring drive of this type offers advantages over more conventional lever systems in that both the motion input and take-off connections may be conveniently selected, without the necessity of changing linkages, at any point around the ring as required by the internal and external space conditions of a particular camera. For example, in one type of lens mirror reflex camera, a flap type of mirror which is pivotally mounted internally of the camera has a forward edge portion which sweeps an arcuate path downwardly as the mirror is tilted from a substantially horizontal position. Thus, though the forward edge of the mirror extends through the ring when the mirror is horizontal, it sweeps down and behind the ring as the mirror is pivoted from the horizontal position. Clearance is sufficient that a take-off spur gear may be meshed with the internal gear segment at this point. Obviously, this internal gear segment, or an external gear segment if dictated by conditions, may be located at any point around the ring where space is available to install the take-off spur gear. Similar considerations apply to the connections between the knob and the ring to complete the input connections.

The use of the ring element or member for transmitting motion from the control knob provides a very sturdy mechanical construction which is durable and which can be conveniently built with sufficiently close tolerances so that the drive is substantially free of lost motion. Additionally, the geometry of the assembly is such that it is ideally adapted for use with cameras having replaceable front-end lens attachments in which the entire lens system and shutter mechanism is removed and replaced as a unit. This affords a basic new concept in camera assemblies which minimizes the problems involved in changing lenses while expediting the operation.

Accordingly, it is a further object of this invention to provide an actuating mechanism for a camera having a detachable lens and shutter mechanism removable as a unit wherein the drive connection between the actuating mechanism and shutter mechanism are easily separable and engageable.

The foregoing statements are illustrative of the various aims and objects of this invention. Other objects and advantages will become apparent from a study of the following specification when considered in conjunction with the accompanying drawings, in which:

Figure 1 is a partial sectional view along the optical axis of a single lens mirror reflex camera, and Fig. 2 is a fragmentary section of the operating mechanism taken at a right angle to the optical axis.

The camera illustrated in Fig. 1 is provided with an interchangeable lens unit 1 which is secured to the camera body 2 by means of a bayonet type of joint connection 3 having cooperating parts on an externally threaded sleeve 4 and lens unit 1. Sleeve 4 threads into an internally threaded sleeve 5 which is rotatably mounted in the front end of body 2. Means (not shown) are provided to prevent sleeve 4 from rotating. Thus when sleeve 5 is rotated, the lens unit is moved along the optical axis to focus the camera.

The lens unit 1 houses in addition to the photographic objective a shutter mechanism the shutter blades of which are shown in Fig. 2. This entire unit is quickly and easily replaceable due to the type of joint provided. A square shaft 6 projects from the lower part of the lens unit. This shaft is connected to the shutter mechanism and is adapted by rotation about its longitudinal axis 7 which parallels the optical axis 8, to function as a tensioning and releasing member for the central shutter.

The actuating mechanism which drives the square shaft 6 comprises a ring 10 which is peripherally journalled by bearings 11 in the housing 2 in a position to be rotated about optical axis 8 but lies entirely outside the optical field. Ring 10 is provided with an internal gear segment 12 having teeth of sufficient width to span the full range of axial adjustment of the lens unit 1 afforded by rotation of adjusting sleeve 5. Rotational movement of ring 10 is transmitted to the square shaft 6 by a spur gear 13 meshing with gear segment 12 and mounted on a shaft 14. Shaft 14 is journalled coaxially of square shaft 6 in a sleeve 16 secured in a stationary flange 17 inwardly disposed of and secured to sleeve 4. The end of shaft 14 adjacent the end of square shaft 6 terminates in a socket 18 which receives the end of square shaft 6.

An external gear segment 19 is provided on the upper side of ring 10. This and the lower gear segment 12 both appear in plan view on ring 10 in Fig. 2. A spur gear 21 mounted on one end of a shaft 22 journalled in housing 2, meshes with gear segment 19. The other end of shaft 22 has secured thereto a bevel gear 23 which meshes with a bevel gear 24 forming part of a gear train including additional gears 26 and 27. Shaft 28 of gear 27 is journalled in a sleeve 29 stationarily secured in housing 2. A cup-shaped gear 31 and a stop member 32 are pinned to shaft 28 to rotate therewith. A flat spiral spring 33 disposed within the cavity of the cup gear 31 connects the cup gear to stationary sleeve 29. Cup gear 31 meshes with a gear 34 journalled substantially concentrically of the axis of a shutter tensioning knob 36. Releasing plunger 37 which projects through knob 36 concentrically of the knob axis projects through gear 34 and terminates in a plate 39. Pin 41 projecting upwardly from plate 39 engages a projection 42 on the bottom side of gear 34. Plunger 37 while axially slidably mounted in knob 36 is secured thereto in a manner to rotate therewith in one direction but is prevented from rotation relative to knob 36 in the other direction in any known manner. Releasing plunger 37 is spring loaded to its upper position by a leaf spring 43 which is secured to the camera body 2 at its left side and passes beneath and engages plate 39 applying an upward bias to the plunger 37. The free end of spring 43 terminates adjacent the hub of stop member 32 and lies above a radial projection 32a thereof.

When knob 36 is rotated, plunger 37 rotates with it. Pin 41, engaging a projection 42 on the lower face of gear 34, drives gear 34, which rotary motion is transmitted through the gear drive including gears 27, 26, 24, 23 and 21 to gear segment 19, ring 10, gear segment 12, and gear 13 to the shutter mechanism shaft 6 which tensions the shutter. When the plunger 37 is depressed, the pin 41 disengages projection 42 and the gear 34 is released. The stored energy in spring 33 now drives the released gear train in the opposite direction as it was rotated by the knob 36 so that the gear train releases the camera shutter. This spring drive of the gear train is limited by stop projection 32a when the latter engages the depressed free end of spring 43.

Obvious modifications of this specific arrangement are apparent. For example, the spur gear 13 and its shaft 14 need not be disposed on a part of the camera body but may be mounted on the lens unit, requiring only that the gear 13 be meshed with gear segment 12 when the lens unit is attached to the camera. Ring 10 need not be a full ring but need only be an arcuate section of sufficient rigidity to satisfactorily transmit the motion and force. Additionally, a circumferential bearing is not needed, as support at three points would be adequate.

These and other equally obvious modifications of this apparatus both in its details and in the organization of such details will be readily apparent to those skilled in the art. Accordingly, it is intended that the foregoing disclosure and the showings made in the drawings shall be considered only as illustrative of the principles of this invention and not construed in a limiting sense.

What I claim is:

1. In a photographic camera, particularly a single lens reflex camera, a camera body provided with a circular opening therein, a first sleeve rotatably mounted in said opening, a second sleeve operatively connected with said first sleeve in such a manner so as to move axially when said first sleeve is rotated, a lens unit detachably secured to said second sleeve, said lens unit including a central shutter having a shaft extending from the rear of said detachable lens unit, and an actuating mechanism for said shaft including an operating shaft, means for rotatably supporting said operating shaft, means for automatically operatively connecting said two shafts when said lens unit is attached to said second sleeve, a gear on said operating shaft, a ring concentrically extending about the optical axis of said lens unit and rotatably mounted in said opening of said body adjacent the inner ends of said sleeves, said ring being arranged outside of the path of the actinic rays adapted to pass through said lens unit and being provided on a portion of its inner circumference with gear teeth meshing with said gear on said operating shaft, gear teeth on a portion of the outer circumference of said ring, a manually operable shutter tensioning knob mounted rotatably on said body for rotating said shaft in one direction, and a gear train operatively connecting said shutter tensioning knob with said gear teeth on the outer circumference of said ring, said gear train including a gear loosely rotatable about the axis of said knob, a coupling between said knob and said gear, spring means for urging said coupling into operative position, and manually operable means for releasing said coupling so as to disengage said shutter tensioning knob from said gear train to permit a rotation of said shaft in the other direction so as to release the previously tensioned shutter.

2. In a photographic camera, particularly a single lens reflex camera, a camera body provided with a circular opening therein, a sleeve provided with an interior thread rotatably mounted in said opening, an externally threaded sleeve engaging the interior thread of said sleeve and adapted to be moved axially when said first mentioned sleeve is rotated, a lens unit detachably secured to the outer end of said externally threaded sleeve, said lens unit including a central shutter having a shaft extending from the rear of said detachable lens unit, and an actuating mechanism for said shaft including an operating shaft arranged in axial alinement with said shaft, means for rotatably supporting said operating shaft, means for operatively connecting said two shafts when said lens unit is attached to said exteriorly threaded sleeve, a gear on said operating shaft, a ring concentrically extending about the optical axis of said lens unit and rotatably mounted in said opening of said said body adjacent the inner ends of said sleeves, said ring being arranged outside of the path of the actinic rays adapted to pass through said lens unit and being provided with inner gear teeth meshing with said gear on said operating shaft, gear teeth on the outer circumference of said ring, a shutter tensioning knob mounted rotatably on said body for rotating said shaft in one direction, and a gear train operatively connecting said shutter tensioning knob with said gear teeth on the outer circumference of said ring, said gear train including a gear loosely rotatable about the axis of said knob, a coupling between said knob and said gear, spring means for urging said coupling into operative position, and manually operable means for releasing said coupling so as to disengage said shutter tensioning knob from said gear train to permit a rotation of said shaft in the other direction so as to release the previously tensioned shutter.

3. In a photographic camera as claimed in claim 2, including a bearing for said operating shaft, said bearing being attached to said exteriorly threaded sleeve adjacent the inner wall thereof whereby said bearing, said operating shaft and gear thereon are moved axially with said exteriorly threaded sleeve when the latter is axially adjusted by said rotatable interiorly threaded sleeve, said inner gear teeth on said ring having an axial length at least equal to the maximum axial adjustment of the lens unit attached to said exteriorly threaded sleeve.

4. In a photographic camera, particularly a single lens reflex camera, a camera body provided with a circular opening therein, a sleeve provided with an interior thread rotatably mounted in said opening, an externally threaded sleeve engaging the interior thread of said sleeve and adapted to be moved axially when said first mentioned sleeve is rotated, a lens unit detachably secured to the outer end of said externally threaded sleeve, said lens unit including a central shutter having a shaft extending from the rear of said detachable lens unit, and an actuating mechanism for said shaft including an operating shaft arranged in axial alinement with said shaft, means for rotatably supporting said operating shaft, means for operatively connecting said two shafts when said lens unit is attached to said exteriorly threaded sleeve, a gear on said operating shaft, a ring concentrically extending about the optical axis of said lens unit and rotatably mounted in said opening of said body adjacent the inner ends of said sleeves, said ring being arranged outside of the path of the actinic rays adapted to pass through said lens unit and being provided with inner gear teeth meshing with said gear on said operating shaft, gear teeth on the outer circumference of said ring, a shutter tensioning knob mounted rotatably on said body for rotating said shaft in one direction, and a gear train operatively connecting said shutter tensioning knob with said gear teeth on the outer circumference of said ring, said gear train including a gear loosely rotatable about the axis of said knob, a coupling between said knob and said gear, spring means for urging said coupling into operative position, said coupling including a manually operable plunger extending axially slidable through said rotatable knob and having at its end which extends into said camera body a coupling member rigidly attached thereto, a coupling member on said loosely rotatable gear, whereby upon depression and axial movement of said plunger against the action of said spring means said coupling is disengaged and said gear train is separated from said rotatable knob to permit rotation of said shaft in the other direction and thereby release the previously tensioned shutter.

5. In a photographic camera, particularly a single lens reflex camera, a camera body provided with a circular opening therein, a sleeve provided with an interior thread rotatably mounted in said opening, an externally threaded sleeve engaging the interior thread of said sleeve and adapted to be moved axially when said first mentioned sleeve is rotated, a lens unit detachably secured to the outer end of said externally threaded sleeve, said lens unit including a central shutter having a shaft extending from the rear of said detachable lens unit, and an actuating mechanism for said shaft including an operating shaft arranged in axial alinement with said shaft, means for rotatably supporting said operating shaft, means for operatively connecting said two shafts when said lens unit is attached to said exteriorly threaded sleeve, a gear on said operating shaft, a ring concentrically extending about the optical axis of said lens unit and rotatably mounted in said opening of said body adjacent the inner ends of said sleeves, said ring being arranged outside of the path of the actinic rays adapted to pass through said lens unit and being provided with inner gear teeth meshing with said gear on said operating shaft, gear teeth on the outer circumference of said ring, a shutter tensioning knob mounted rotatably on said body for rotating said shaft in one direction, and a gear train operatively connecting said shutter tensioning knob with said gear teeth on the outer circumference of said ring, said gear train including a gear loosely rotatable about the axis of said knob, a coupling between said knob and said gear, spring means for urging said coupling into operative position, a spiral spring which is tensioned when said knob is rotated in shutter tensioning direction, said coupling including a manually operable plunger extending axially slidable through said rotatable knob and having at its end which extends into said camera body a coupling member rigidly attached thereto, a coupling member on said loosely rotatable gear, whereby upon depression and axial movement of said plunger against the action of said spring means said coupling is disengaged and said gear train is separated from said rotatable knob to permit rotation of said shaft in the other direction under the action of said tensioned spiral spring and thereby release the previously tensioned shutter.

References Cited in the file of this patent

UNITED STATES PATENTS

| 2,124,885 | Mihalyi | July 26, 1938 |
| 2,231,730 | Mihalyi | Feb. 11, 1941 |
| 2,233,006 | Goldhammer | Feb. 25, 1941 |
| 2,319,304 | Dalotel | May 18, 1943 |
| 2,384,639 | Riddel | Sept. 11, 1945 |
| 2,401,134 | Bretthauer | May 28, 1946 |
| 2,698,356 | Roos | Dec. 28, 1954 |

FOREIGN PATENTS

| 473,097 | Italy | July 11, 1952 |
| 1,028,228 | France | Feb. 25, 1953 |